TELEPHONE SYSTEM

Filed Sept. 14, 1953 2 Sheets-Sheet 1

Inventors:
Alois Brandstetter
Walter Rufer
By [signature]
Atty.

Sept. 24, 1957 A. BRANDSTETTER ET AL 2,807,670

TELEPHONE SYSTEM

Filed Sept. 14, 1953 2 Sheets-Sheet 2

Inventors:
Alois Brandstetter
Walter Rufer
By [signature]
Atty.

United States Patent Office 2,807,670

Patented Sept. 24, 1957

2,807,670

TELEPHONE SYSTEM

Alois Brandstetter and Walter Rufer, Munich, Germany, assignors to Siemens & Halske Aktiengesellschaft, Munich, Germany, a corporation of Germany Application September 14, 1953, Serial No. 379,818

Claims priority, application Germany January 9, 1953

6 Claims. (Cl. 179—18)

This invention relates to signalling systems and is particularly concerned with telephone systems having circuit means for switching trunks to preferred or special subscribers. The trunks may be of substantial length and may include amplifiers if desired. The term "trunks" is intended to include physical trunk lines and also carrier frequency lines and radio-telephone connections.

It is known to switch such trunks at either end from the normal path of connection to preferred subscribers under the control of special criteria. The switching-over may take place alternately at both ends of a trunk.

It is the object of the present invention to employ, for the switching-over of trunks to preferred subscribers, criteria of such a nature that, first, they can be transmitted through amplifiers, second, they cannot be produced by voice frequencies, and third, erroneous calling of preferred subscribers is prevented. This last mentioned contingency could arise if both subscribers initiated outgoing connections simultaneously, thus seizing the transmission paths in the sense of outgoing calls, and if at the end of the conversation one subscriber has already hung up and the other subscriber thereafter releases the connection by restoring the receiver.

The present invention solves the problem by employing a long seizure pulse as a criterion for the switching-over of the lines, while released, and thus switching back of the trunk from the special subscribers to the normal path of transmission, is caused by a short release pulse. This short release pulse cannot under any circumstances cause renewed seizure at the othe end which would result in unintentional calling of the special subscriber at that end.

Figure 1:
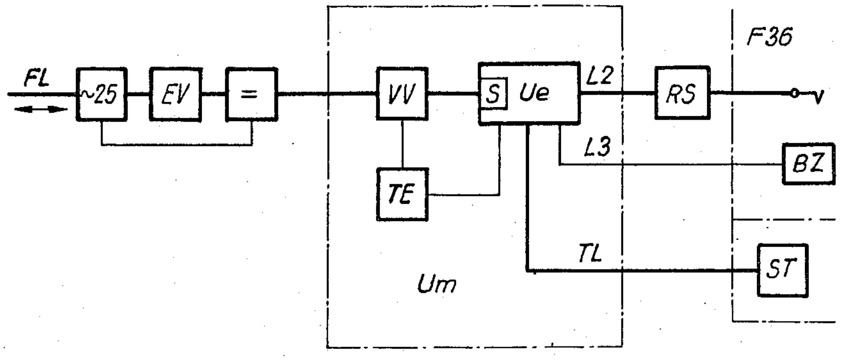
Figure 3:
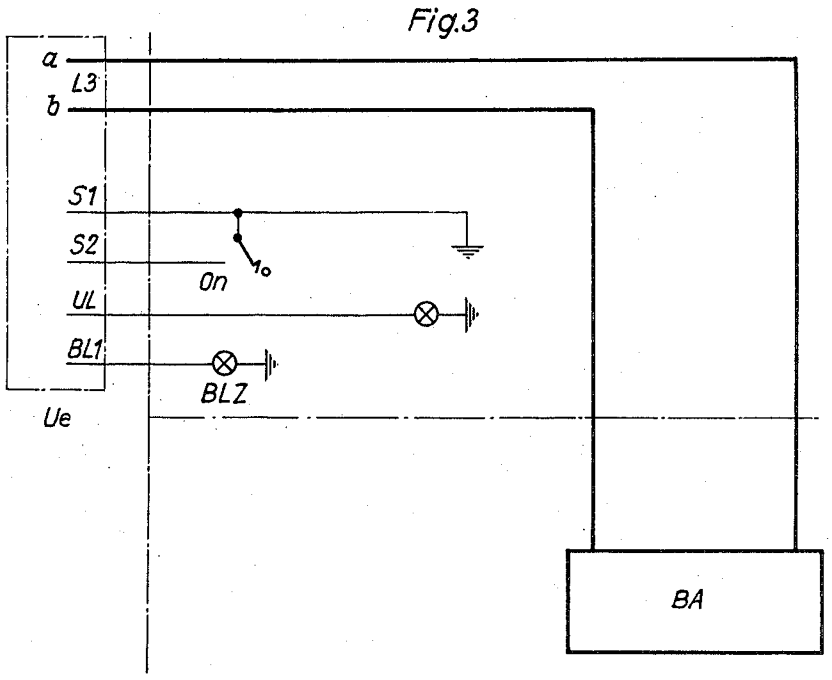
Figure 2:
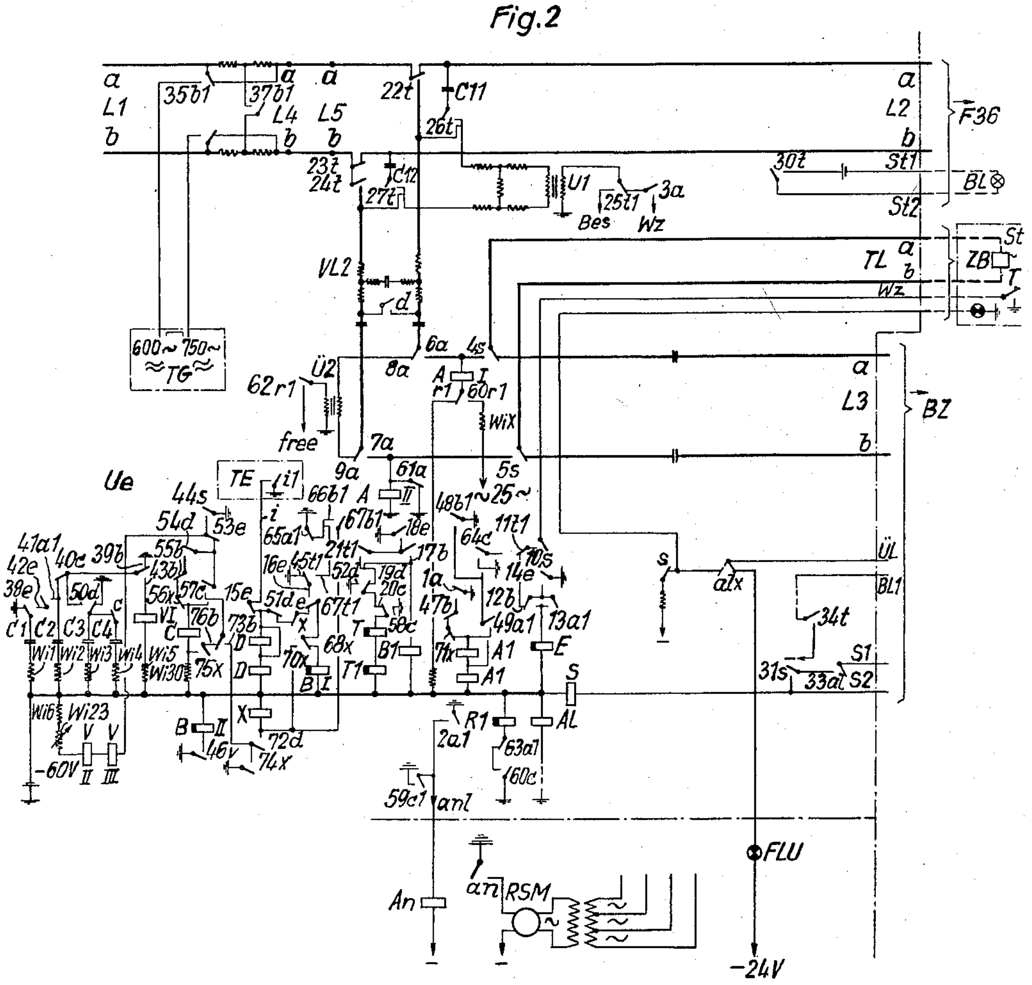

An embodiment of the invention is diagrammatically illustrated in the drawings, in which Fig. 1 is a block diagram showing in schematic form a toll line FL and the connecting devices required for making preferred connections;

Fig. 2 illustrates circuit details of the transmission or repeater device Ue of Fig. 1; and Fig. 3 shows diagrammatically the circuit of the auxiliary service device BZ of Fig. 1.

Referring now to Fig. 1, there is a toll line or trunk FL which is operated in both directions. This line or trunk is provided with identical switching equipment at both ends. For the sake of simplicity, only one end of the trunk is illustrated in Fig. 1. The trunk terminates in a switch-over apparatus UM comprising a first-stage or pre-amplifier VV, a sound frequency receiver TE, and the repeater or transmission unit Ue associated with a sound transmitter S. On the trunk side of the switch-over apparatus, a final-stage or terminal amplifier EV may be provided, which is in usual manner by-passed by a ringing converter, 25-cycle, in a D. C. circuit. In normal traffic, the trunk FL is in the repeater Ue switched directly to line L2 and thus to call device RS and a toll position such as F36. The operator at such position completes calls to normal subscribers by known not illustrated means and in conventional manner.

Branched off from unit Ue in the switch-over apparatus is a line TL leading to a special subscriber station ST to which the toll line or trunk may be switched responsive to a call initiated by a special subscriber, the switching-over being if necessary made by interrupting a normal call then existing over the two toll positions. The toll position has a service unit BZ associated therewith, which is connected to repeater or transmission unit Ue over the line L3. This service unit contains all the equipment, such as lamps, keys and switches, necessary for establishing a preferred connection.

The relay transmission or repeater unit Ue has the function of connecting the toll trunk to the preferred subscribers in incoming and outgoing traffic, and of switching back to normal from these connections. It must transmit and evaluate the seizure pulse signal which causes the switch-over, and also the release pulse signal; it must call the desired preferred subscriber and must transmit the requisite signals to, or receive them from, the toll position, the auxiliary service unit, and the special subscriber's station. The seizure and release pulses are transmitted over the toll trunk at sonic frequency, preferably at a mixed frequency of, say 600/750 cycles. In accordance with the present invention, the seizure pulse is of long duration, about 2 seconds, while the release pulse is very much shorter, about 0.6 second. On the receiving side, the incoming sonic frequency pulses are transmitted over the pre-amplifier VV to the sound frequency receiver where they are converted into direct-current pulses which are received by the transmission or repeater unit Ue over a conductor *i* shown in the left hand lower part of Fig. 2.

The manner in which a special or preferred connection is established will now be described with reference to Figs. 2 and 3.

It should be pointed out first that relays S and AL in the repeater unit Ue are normally operated. Relay AL is energized in a circuit extending from ground at the switch frame and relay S is operated responsive to actuation of the On key of the service unit BZ, Fig. 3, and line S2, over its own contact 31*s* and contact 33*a*1 and line S1 to the service unit.

If the special or preferred subscriber ST wishes to establish an outgoing call to the special subscriber at the other end, he first lifts his receiver and then depresses his grounding key T. Only the sequential performance of these two steps initiates seizure and switch-over, and unintentional seizure of the toll trunk is thus prevented.

The closure of the loop upon lifting of the special subscriber's receiver operates relay A in a circuit extending from ground, contact 61*a* in normal position, contact 5*s* in operated position, line conductor *b*, preferred subscriber station S*t*, line conductor *a*, closed contact 4*s*, winding I of relay A, contact *r*1 in normal position, to battery. Contact 1*a* of relay A causes operation of relay A1 in a circuit extending from ground, contact 1*a*, contacts 47*b* and 71*x*, windings of relay A1 to battery. Contact 2*a*1 connects the ringing and signaling machine over line *an*1. To indicate that the apparatus is ready to be seized, the special subscriber receives the dial tone WZ over contact 3*a* and repeater U1 shown in the top part of Fig. 2. Since relays S and A are energized, repeater U1 is connected to the special subscriber's line TL over contacts 4*s*, 5*s*, and 6*a*, 7*a*. Upon operation of relay A1, and due to grounding of line W*z* through the special subscriber's key T, relay E in repeater unit Ue is energized in a circuit extending from ground, key T, line W*z*, 10*s*, 11*t*1, 12*b*, 13*a*1, winding of relay E, to battery. Relay E closes its contact 14*e* thus completing a holding circuit for itself. Contact 15*e* opens conductor *i* leading to the sound frequency receiver TE. Closure of contact 16*e* operates relay B. Upon closure of contact 17*b*, relay B1 will energize in a circuit extending from ground, 18*e*, 17*b*, B1, to battery; only thereafter do relays T and T1 operate, due to their copper slugs, the circuit therefor extending from ground, 18*e*, 17*b*, 19*d*, 20*c*, T, T1, to battery. Holding contact 21*t*1 maintains relays T and T1 energized.

Contacts 22*t*, 23*t*, 24*t* disconnect the toll trunk from the toll operator position F36 and connect it to the preferred subscriber's station. Contact 25*t*1 connects busy tone "B*es*" to repeater U1. This busy tone is an audible indication of completion of the switch-over and is transmitted through repeater U1 symmetrically to the *a* and *b* conductors of line L2 to the toll operator position F36, by means of contacts 26*t*, 27*t* and condensers C11, C12. Closure of contact 30*t* operates over conductors S*t*1, S*t*2 a busy-signal lamp BL, drop or the like at the toll operator position. In the service unit BZ, busy-signal lamp BLZ is operated over conductor BL1 and contact 34*t*.

When relay B1 operates, closure of its contacts 35*b*1, 36*b*1 causes the 600/750-cycle mixed frequency signal (the seizure pulse) to be transmitted from generator TG to line L1 and thence to trunk FL. During transmission, contact 37*b*1 causes the trunk to be connected for both directions, with suitable resistances being incorporated.

The duration of the outgoing seizure pulse is determined by a condenser circuit co-operating with relay V. Condensers C1 and C2 are charged, during idling periods, through contact 38*e* and contacts 39*b*, 40*c*, respectively. Upon seizure, these condensers are connected in parallel through contacts 41*a*1, 42*e*. Upon operation of relay B, relay V is energized in a circuit from ground, W*i*5, VI, 43*b*, 40*c*, 41*a*1, 42*e*, ground potential at C1 and C2. Relay V is biased through its counter-windings II and III (left hand bottom of Fig. 2) in a circuit from ground, 44*s*, VII, VIII, W*i*23, W*i*6, to battery and remains energized until the condenser charge fades to a proper value. The counter-energization has the effect that the timing circuit is highly voltage-independent.

Upon operation of relay T1, the energizing circuit for BI is interrupted at 45*t*1, but the relay remains operated through its winding II (left hand bottom of Fig. 2) and contact 46*v*. Since the circuit for relay A1 is opened at contact 47*b*, the contact 48*b*1 takes over the function of holding relay A1 during pulse transmission. Relay V releases when the condenser discharge current has dropped to below the release value of this relay. The relay B also deenergizes. Upon release of relay B, condensers C1, C2 are conditioned again for charging at contact 39*b*. Opening of contact 17*b* interrupts the circuit of relay B1. This relay deenergizes and terminates the transmission of the seizure pulse. The circuit including condensers C1, C2 is such that the seizure or busy pulse will have a duration of not less than 2.2 seconds. In the repeater unit on the outgoing call side, relays A, A1, E, S, T, T1 and AL are energized during conversation.

At the other end of the trunk, where an identical relay repeater unit is provided, the mixed-frequency busy or seizure pulse received over the trunk is passed in the switch-over apparatus through the first-stage amplifier to the sound frequency receiver TE. The sonic frequency pulse is rectified in the receiver and transmitted over conductor *i* to the relay repeater unit. Contact *i*1 grounds the conductor *i*. This causes repeater relay B to operate first, while the parallel relay D operates with some lag due to its slow-to-energize winding. As relay B operates before relay D, relay C cannot immediately be energized. Relay V is connected by contact 43*b* for operation by the charged condenser C2. Upon operation of relay D, contact 50*d* connects the charged condensers C3 and C4 in parallel with condenser C2 so that relay V can remain energized until all three condensers have been discharged. Opening of contact 51*d* breaks the energizing circuit for relay B, but the latter is held by its winding II and contact 46*v*. Contact 52*d* causes operation of relays T and T1. As already described, these relays switch the trunk over to the preferred subscriber and transmit a busy signal to the line leading to the toll operator position at the exchange. Also, the busy lamp or drop BL is operated at the exchange, as well as the busy lamp BLZ in the service unit. As contact 11*t*1 is open, it is no longer possible to seize the switch-over apparatus for an outgoing call.

Relay V continues to be operated by the discharge currents from condensers C2, C3 and C4 for a period of about 1.3 seconds. When it thereafter releases, relay B also becomes deenergized. Since relay D continues to hold over the *i* conductor for the duration of the seizure or busy pulse, which lasts at least 2.2 seconds, relay C can operate after release of relay B, from ground, 44*s*, 53*e*, 54*d*, 55*b*, 56*x*, C, W*i*30, to battery. Relay C is held energized over its contact 57*c* independently of relay D. Relays T and T1 continue to be held over contact 58*c*. The determination of the length of the pulses with the aid of the release period for relay V insures that the apparatus can be seized only if the seizure or busy pulse exceeds an accurately defined minimum length.

Upon operation of relay C, contact 59*c* starts the ringing and signaling machine. Contact 60*c* causes operation of relay R1. Contact 60*r*1 transmits 25-cycle ringing current to the desired preferred subscriber over a circuit extending from ground, source of 25-cycle current (central part of Fig. 2), WiX, 60*r*1, AI, 4*s*, a conductor, station loop at the preferred subscriber, *b* conductor, 5*s*, 61*a*, to ground. The relay A, made slow-to-energize by its short-circuited second winding AII, does not respond to the ringing current. Through contact 62*r*1 and repeater U2, the idle signal is transmitted over the trunk to the calling preferred subscriber, to indicate that the desired subscriber is being called.

In order to insure effectiveness of the release pulse in the event that the calling subscriber should hang up while the idle signal is being transmitted, this signal is resolved into a plurality of brief signals by a suitable self-interrupting circuit arranged in the board.

When the called special subscriber answers by lifting his receiver, the D. C. loop at his station closes and operates the relay A of the repeater unit U*e* allotted to him. Upon opening of contact 61*a*, the two windings I and II of relay A are symmetrically connected to the two line conductors to supply battery to the called special subscriber. Opening of contacts 8*a*, 9*a* causes the idle signal to be cut off from the trunk and thus from the calling preferred subscriber. Closing of contacts 6*a*, 7*a* connects the trunk to the called preferred subscriber. Relay A1 is operated through contact 1*a* as described before, and by actuating contact 63*a*1 it releases relay R1 thereby disconnecting the ringing signal. During conversation, relays A, A1, C, S, T, T1 and AL of the repeater unit on the called side are in operation. The two subscribers can now converse.

If the called preferred subscriber replaces his receiver, the resultant interruption of the subscriber's loop opens the holding circuit for relay A. While the latter releases, relay A1 continues to operate from ground, 64*c*, 49*a*1, A1, to battery. No listening or switching signal is sent over the trunk. The transmission or repeater unit remains busy, and the trunk remains switched to the preferred subscriber. Release of the repeater unit and switching-back of the trunk to the associated toll position in the exchange will not take place until the calling preferred subscriber has also replaced his receiver at the end of the conversation and thereby initiating transmission of the release pulse. Opening of the calling subscriber's loop releases relay A. Opening of contact 1*a* breaks the holding circuit for relay A1 which also releases. Upon release of relay A1, relay B is operated in a circuit from ground, 65*a*1, 66*b*1, 67*t*1, 16*e*, 68*x*, winding of BI, to battery. This causes relay B1 to be operated again, which transmits the release impulse over its contacts 35*b*1, 36*b*1. Contact 43*b* operates relay V, which is held until condenser C2 is discharged. Closure of contact **67*b*1 and opening of contact 66*b*1 opens the energizing circuit for relay B, but the latter is maintained operated through its second winding and contact 46*v*. Contact 67*b*1** actuates relay X. When relay V is released after discharge of condenser C2, relay B also becomes deenergized. Its release in turn releases B1, whereby the transmission of the release pulses is terminated. The release pulses have a length of about 600 milliseconds.

Relay E, which has been held operated over contact **12*b* after opening of contact 13*a*1, becomes deenergized upon release of relay B and releases with some delay. Relay X continues to be held after release of relay B1 until contact 16*e* is opened; the holding circuit extending from ground, 45*t*1, 16*e*, 70*x*, X, to battery. Opening of contact 71*x* prevents the preferred subscriber from reenergizing relay A1 responsive to lifting his receiver during the release operation and thereby disturbing this operation. Opening of contact 18*e* causes delayed release of relays T and T1. This causes the trunk to be switched back to the toll operator position F36** of the exchange. The busy signal is cut off, the circuit for the lamp or drop at the exchange is broken, and the circuit for the busy lamp in the service unit BZ is opened. The transmitting or repeater unit is now ready for a new call.

At the other end of the trunk, the release pulse is received in the sound frequency receiver TE. For the duration of this pulse, ground potential is applied to the *i* wire leading to repeater unit U*e*. Just as in making a connection, relay B is operated before relay D also in the release operation. Upon operation of relay D, relay V can be energized again by charged condenser C3 over contacts **50*d*, 43*b*. Also, relay X is operated over contact 72*d* in a circuit from ground, 44*s*, 53*e*, 57*c*, 73*b*, 72*d*, X, to battery. Relay X is held over its contact 74*x*, Upon opening of contact 51*d* the energizing circuit for relay B is opened, but the relay is held in operated condition over its second winding and contact 46*v*. Upon discharge of condenser C3, relay V is released. The condenser circuit is such that relay V remains operated for about 100 milliseconds. Upon opening of contact 46*v*, relay B is released. Relay X continues to be held over contact 72*d* for the 600 milliseconds' duration of the release pulse. Relay C is now short-circuited over 57*c*, 76*b*, 75*x* and releases. The circuit thus insures that release takes place only if the release pulse exceeds a predetermined minimum length. Release of relay C opens the holding circuit for relay A1 at contact 64*c* so that this relay is released. Relays T and T1 continue to be held over contact 52*d* after release of relay C. Ultimately, when relay D is deenergized at the conclusion of the release pulse, the holding circuits for relays X, T and T1 are opened so that these relays are released. Restoration of relays T and T1 switches the trunk back to the toll operator position F36** of the exchange, cuts off the busy signal and breaks the circuit for the lamp or drop at the toll position. The busy lamp in the service unit BZ is disconnected. The apparatus is now again ready for calls in either direction.

Changes may be made within the scope and spirit of the appended claims.

We claim:

1. In a telephone system having normal subscribers and preferred subscribers and having relatively long trunk lines for two-way traffic which are normally connected for establishing connections between normal subscribers, apparatus at each end of a trunk line for switching such trunk lines to preferred subscribers, said apparatus comprising means controlled by a calling preferred subscriber for transmitting a switching criterion of a duration which is relatively long as compared with the duration of signals constituting switching criteria transmitted in establishing calls between normal subscribers, to switch said trunk line from normal traffic to a preferred subscriber, and means for transmitting a criterion of shorter duration for releasing the connection between preferred subscribers and for switching said trunk line back to normal traffic.

2. The system and co-operation elements as set forth in claim 1, wherein said switching criteria are sound frequency signals.

3. The system and co-operation of elements as set forth in claim 1, wherein said switching criterion of relatively long duration is an impulse of a length on the order of 2 to 3 seconds, said criterion of shorter duration having a predetermined minimum length, both criteria consisting of mixed frequencies.

4. The system and co-operation of elements as set forth in claim 1, comprising condenser and coacting relay means for measuring the duration of said criteria.

5. The system and co-operation of elements as set forth in claim 1, wherein the transmission of said criterion of relatively long duration is contingent upon a plurality of distinct switching operations executed by the calling preferred subscriber.

6. The system and co-operation of elements as set forth in claim 1, wherein the means controlled by the preferred calling subscriber comprises circuit means operatively responsive to removing the receiver and circuit means comprising a key coacting therewith.

References Cited in the file of this patent

UNITED STATES PATENTS

| | | |
|---|---|---|
| 2,314,518 | Sandalls | Mar. 23, 1943 |
| 2,350,193 | Rhoads | May 30, 1944 |
| 2,594,719 | Beale | Apr. 29, 1952 |